United States Patent
Müller et al.

(10) Patent No.: US 12,292,724 B2
(45) Date of Patent: May 6, 2025

(54) MODULAR CONTROL DEVICE WITH REDUNDANT CHANNEL UNITS

(71) Applicant: Pilz GmbH & Co. KG, Ostfildern (DE)

(72) Inventors: Udo Müller, Ostfildern (DE); Winfried Gruber, Ostfildern (DE); Richard Veil, Ostfildern (DE); Johannes Digel, Ostfildern (DE); Stephan Raidt, Ostfildern (DE); Jürgen Riecker, Ostfildern (DE)

(73) Assignee: Pilz GmbH & Co. KG, Ostfildern (DE)

( * ) Notice: Subject to any disclaimer, the term of this patent is extended or adjusted under 35 U.S.C. 154(b) by 560 days.

(21) Appl. No.: 17/586,999

(22) Filed: Jan. 28, 2022

(65) Prior Publication Data

US 2022/0244694 A1  Aug. 4, 2022

(30) Foreign Application Priority Data

Jan. 29, 2021 (DE) .......................... 102021102169.3

(51) Int. Cl.
*G06F 11/16* (2006.01)
*G05B 9/03* (2006.01)
*G05B 19/042* (2006.01)

(52) U.S. Cl.
CPC ........... *G05B 19/0425* (2013.01); *G05B 9/03* (2013.01); *G06F 11/16* (2013.01)

(58) Field of Classification Search
CPC ........ G06F 11/16; G05B 9/03; G05B 19/0425
USPC ........................................................ 710/15
See application file for complete search history.

(56) References Cited

U.S. PATENT DOCUMENTS

| | | | |
|---|---|---|---|
| 2005/0146229 A1* | 7/2005 | Lamarche | G05B 9/03 307/116 |
| 2005/0237232 A1* | 10/2005 | Yoshino | H03M 13/00 341/59 |
| 2006/0282702 A1* | 12/2006 | Bando | G06F 11/1687 714/E11.063 |
| 2008/0165464 A1* | 7/2008 | Veil | G05B 9/03 361/102 |
| 2011/0026411 A1* | 2/2011 | Hao | H04L 12/40189 370/249 |

(Continued)

FOREIGN PATENT DOCUMENTS

| | | |
|---|---|---|
| DE | 102012101516 A1 | 8/2013 |
| DE | 102013111179 A1 | 4/2015 |

(Continued)

*Primary Examiner* — Christopher B Shin
(74) *Attorney, Agent, or Firm* — Miller Johnson

(57) ABSTRACT

A head module for a modular control device includes redundant channel units, each including a processing unit and multiple failure revelation units. The head module includes a bus disconnection unit configured to shut down a communication bus. The failure revelation units are configured to monitor a state of the channel units. The processing units are configured to continuously stimulate the failure revelation units. At least one of the processing units is coupled to signal wires of the communication bus to provide a communication link to one or more peripheral modules of the modular control device. The failure revelation units are further configured to control, based on the stimulation and the monitoring, the bus disconnection unit.

20 Claims, 6 Drawing Sheets

(56) References Cited

U.S. PATENT DOCUMENTS

| | | |
|---|---|---|
| 2014/0362480 A1 | 12/2014 | Veil et al. |
| 2015/0023178 A1* | 1/2015 | Gruber .................. H04B 1/16 |
| | | 370/241 |
| 2015/0135011 A1* | 5/2015 | Fraser ............... G06F 11/0796 |
| | | 714/24 |
| 2016/0181796 A1* | 6/2016 | Fifield ............... H01L 23/5228 |
| | | 361/56 |
| 2016/0217088 A1 | 7/2016 | Veil et al. |

FOREIGN PATENT DOCUMENTS

| | | |
|---|---|---|
| EP | 1857900 A2 | 11/2007 |
| EP | 2544058 A1 | 1/2013 |

* cited by examiner

MODULAR CONTROL DEVICE WITH REDUNDANT CHANNEL UNITS

CROSS-REFERENCE TO RELATED APPLICATIONS

This application claims priority to German Application No. 10 2021 102 169.3 filed Jan. 29, 2021. The entire disclosure of the application referenced above is incorporated by reference.

FIELD

The present disclosure relates to modular control devices and more particularly to redundant control devices for safety-related control.

BACKGROUND

Control devices (also referred to as controllers) are generally known in the field of automation technology. Control devices control technical systems, machines or processes. A distinction is made between link-programmed controllers, which perform control tasks by means of hard-wired logic, and programmable logic controllers, which are freely programmable and can thus perform various control tasks. Due to their flexibility and adaptability, the latter have become established for complex or dynamically changing control tasks in process and automation technology.

A control device is called modular if it is made up of individual components, each of which performs a different task. Generally, a modular control device has at least one central computing unit, also referred to as a head module, which regularly forms the first module of a module row. Further modules of the module row can be, among others, input and output modules, which establish a connection to the periphery of the technical system and are therefore also summarized under the uniform term peripheral module. The input modules detect states of the technical system or machine by connecting their inputs with corresponding sensors. The captured states at a given time are called the process image of inputs (PII). The output modules assert control over the technical system or machine according to the desired control task and depending on the inputs. For this purpose, the outputs of an output module are connected to corresponding actuators. The outputs set by the output module are called process image of outputs (PIO).

Special control devices are safety control devices (also called safety controls or fail-safe (FS) controls). These perform the same functions as normal control devices, but differ in that they are able to perform safety-related tasks in addition. Safety controllers allow safety to be interconnected by programming in a similar way to normal control devices. While safety controllers differ only slightly in their basic function from normal control devices for standard tasks, they have additional hardware and software internally that perform safety-related functions. The additional hardware and software is significantly reflected in a redundant design of essential components of a control device as well as in test facilities that can ensure the functionality of individual components.

A special type of failure that safety controllers must take into account are common cause failures (CCF), i.e. failures that occur as a result of a single failure cause or event. A safety controller must be able to handle these errors, especially if they undesirably remove redundancy from a safety-related subsystem. Typically, CCF are addressed with diversity, i.e., by using different components to provide a certain function. Diversity, however, is of limited help for CCF caused by a common power supply, e.g. by an overvoltage. Other approaches are necessary for this, unless a second independent power supply is being used for each element.

Safety controllers, together with the sensors and actuators connected to them, implement safety functions to protect operating personnel, the environment or goods. To specify the requirement for the safety integrity of safety functions assigned to a safety-related system, the relevant standards (EN 61508) distinguish between four levels. Safety Integrity Level 4 (SIL4) represents the highest level of safety integrity and Safety Integrity Level 1 (SIL1) the lowest level. The modular control devices considered in the following are safety controllers that allow the construction of systems up to at least SIL3.

Applications up to SIL4 in accordance with EN 61508 or applications with special requirement profiles (e.g. railroad applications) are generally difficult to implement with standard modular safety controllers or can only be implemented with great effort, e.g. by using two completely independent and separately configured safety controllers for the application.

SUMMARY

It is an object to specify a modular control device that enables applications with a high safety integrity level. Furthermore, it is an object to specify a modular control device that enables applications with special requirement profiles. Yet further, it is an object to specify a modular control device that masters CCF effectively and can be implemented in cost-effective manner.

According to an aspect of the present disclosure, there is provided a head module for a modular control device having redundant channel units, each comprising a processing unit and failure revelation units, wherein the failure revelation units are configured to monitor a state of the channel units, and wherein the processing units are configured to continuously stimulate the failure revelation units, wherein at least one processing unit of the redundant channel units is coupled to signal wires of a communication bus to provide a communication link to one or more peripheral module parts of the modular control device, and wherein the failure revelation units are configured to control, based on the stimulation and monitoring, a bus disconnection unit which is configured to shut down the communication bus.

According to a further aspect of the present disclosure, there is provided a peripheral module part for a modular control device having redundant channel units and an output unit, wherein the output unit is configured to set one or more outputs in response to control by the redundant channel units, wherein the channel units each comprise a processing unit and failure revelation units, wherein the failure revelation units are configured to monitor a state of the respective channel unit, wherein the processing units are arranged to respectively stimulate the failure revelation units, and wherein the failure revelation units of each channel unit are collectively arranged to control setting of the outputs of the output unit in response to the stimulation and monitoring.

According to a further aspect of the present disclosure, there is provided a modular control device comprising a head module and a peripheral module part of said type.

According to yet a further aspect of the present disclosure, there is provided a method for a head module of a modular controller, the head module having redundant channel units each comprising a processing unit and failure revelation units, wherein the failure revelation units monitor a state of the respective channel unit, wherein the processing units continuously stimulate the failure revelation units, wherein at least one of the processing units is coupled to signal wires of a communication bus to provide a communication link to one or more peripheral module parts of the modular control device, and wherein the failure revelation units control a bus disconnection unit to shut down the communication bus in response to the stimulation and monitoring.

It is thus an idea of the present disclosure to adapt a modular safety controller in such a way that, by means of extensions in the head module and, if necessary, the peripheral modules, interaction between these modules is possible in a manner that applications with high safety requirements can be realized. The extensions may include a multi-channel design of the peripheral modules and additional failure revelation units in the head module and peripheral modules. By distributing the extensions between the head module and peripheral modules in the claimed manner and, for example, by using a defined communication relationship between the head module and peripheral modules and an appropriately designed power supply, applications with high safety requirements can be realized.

The head module as well as the peripheral module parts can have a multi-channel design, so that communication according to the black channel principle is possible via a communication bus. The peripheral module parts can also be intrinsically safe and independent of the associated head module with regard to a safety function to be implemented. Furthermore, both the head module and the peripheral module parts can implement state monitoring, e.g. voltage monitoring, which in the event of a fault condition (e.g. an overvoltage) brings about a safe condition regardless of whether the fault condition occurs in the head module or in the peripheral modules. For this purpose, the state monitoring in the head module acts on a bus disconnection unit integrated in the head module, which can interrupt communication between the head module and the peripheral module parts. State monitoring in the peripheral module parts can also be configured to act directly on the outputs of the safety controller to switch them off in the event of a fault.

The disconnection of the communication bus in combination with independent failure revelation units makes it possible to interrupt the communication between the head module and the peripheral modules, so that the case can be controlled that both processing units fail at the same time, yet nevertheless compute the same wrong process image of the outputs and based on this generate wrong, albeit valid, telegrams and transmit these over the bus.

The interaction of the components of a modular control device modified in the claimed manner thus enables the realization of a safety function with a single modular control device for applications with a higher requirement profile than SIL3, since, among other things, CCF can be adequately taken into account.

In a further refinement of the head module, the failure revelation units can comprise a monitoring unit and a failure detection unit per channel unit, wherein the monitoring units are configured to monitor each a power supply unit of the channel units, and wherein the failure detection units are configured to provide a signal in response to the stimulation.

The monitoring units can, for example, monitor the supply voltage for overvoltages and undervoltages. The failure detection units can, for example, implement a watchdog circuit. The monitoring units and failure detection units together form the failure revelation unit. In various embodiments, they can be implemented independently of each other, i.e. the monitoring unit and the failure detection unit of one channel unit are independent of a monitoring unit and a failure detection unit of the respective other channel unit.

In a further refinement of the head module, the bus disconnection unit can comprise a switching element for each channel unit arranged in the signal wires of the communication bus, and wherein each failure revelation unit of each channel unit is associated to one of the switching elements, and wherein the failure revelation units are configured to act jointly on the associated switching element.

The bus disconnection unit can thus disconnect the signal-carrying wires of the communication bus in order to shut down the communication bus. This design allows any communication via the bus to be prevented in a simple and effective manner.

In a further refinement of the head module, the monitoring units of each channel unit can be configured to generate a dynamic control signal based on the monitoring in order to act on the associated switching element, for instance, via a respectively associated charge pump.

According to this refinement, the bus disconnection unit is dynamically controlled, whereby stuck-at-high faults can be eliminated effectively. The bus disconnection unit enables communication via the bus only when the dynamic signal is present. A charge pump can be used for this purpose, which is fed only from the alternating component of a signal and actuates a switching element in the bus disconnection unit. This refinement thus further enhances intrinsic safety of the head module.

In a further refinement of the head module, the failure detection units can be configured to interrupt the generation of the dynamic control signal in response to the stimulation by the respective processing unit.

According to this refinement, the failure detection unit is connected to the monitoring unit via a logical "AND" operation (i.e. their signals are combined by a logical "AND"). For example, the failure detection unit, which is implemented as a watchdog, can pull the dynamic signal to "ground" and thus switch it off in the absence of a stimulation by the associated processing unit. The "AND" linking of the monitoring units can thus be realized easily, effectively and safely.

In further refinement of the head module, the head module may include at least one capacitor arranged in series in a signal path of the failure revelation units in each of the channel units between the processing unit and the bus disconnection unit.

Decoupling in the signal path from the processing unit to the bus disconnection unit can be implemented via the capacitor in a simple and effective manner.

In a further refinement of the head module, the channel units can be configured to communicate exclusively via the communication bus with the one or more peripheral module parts of the modular control device.

According to this refinement, the head module and the peripheral module parts communicate with each other exclusively via the communication bus, which can be acted upon by the bus disconnection unit. Since the head module shuts down the communication bus in the event of a fault, no more messages are sent to the peripheral modules so that they switch off their outputs to bring about a safe state.

In a further refinement of the head module, the processing units of each channel unit can be configured to communicate with each other via an interface independent of the communication bus in order for wherein the processing units to monitor each other. In various embodiments, an overvoltage protection for the interface can be designed based on a respective provided and monitored supply voltage. It can be formed of resistors whose resistance values are set based on a switch-off voltage of the monitoring units.

This refinement further enhances intrinsic safety of the head module. It is sufficient that the interface is protected against overvoltages by simple resistors, since the monitoring unit only permits a defined overvoltage. The overvoltage protection must therefore only be designed up to a certain voltage and can thus be easily implemented using resistors.

In a further refinement of the head module, the processing units of each channel unit can be configured to perform a functional test of the associated failure revelation units and to read back a test result. In various embodiments, the processing units can provide the test result to the respective other processing unit.

The processing units can thus continuously check the functionality of the monitoring unit and the failure detection unit via tests in order to be able to rule out malfunctions of these units. This refinement thus further contributes to the intrinsic safety of the head module.

In a further embodiment, the peripheral module part may also have the intrinsic safety measures described in connection with the head module. Thus, the monitoring unit of each channel unit in the peripheral module part can be configured to generate a dynamic control signal in response to the monitoring in order to control the output unit. Control can be asserted via a charge pump. Further, the failure detection unit of each channel unit in the peripheral module part can be configured to interrupt the generation of the dynamic control signal in response to the stimulation of the first processing unit. Finally, the output unit of the peripheral module part can be galvanically isolated from the redundant channel units.

In further refinements, the modular control device may include the various embodiments of the head module or the peripheral module part. Further, the modular control device may include a power supply module configured to provide a common module voltage as power supply for the head module and the peripheral module parts, and a peripheral voltage for the output unit of the peripheral module parts. The power supply module can be a non-failsafe unit.

The modular control device may also have backplane module parts that provide a bus structure for the communication bus and for power supply. The backplane module parts can be combined with one or more peripheral module parts to form a peripheral module.

It goes without saying that the features mentioned above and those to be explained below can be used not only in the combination indicated in each case, but also in other combinations or on their own, without leaving the scope of the present disclosure.

As used herein, the phrase at least one of A, B, and C should be construed to mean a logical (A OR B OR C), using a non-exclusive logical OR, and should not be construed to mean "at least one of A, at least one of B, and at least one of C.

BRIEF DESCRIPTION OF THE DRAWINGS

Embodiments of the invention are shown in the drawings and are explained in more detail in the following description.

DETAILED DESCRIPTION

Figure 1:
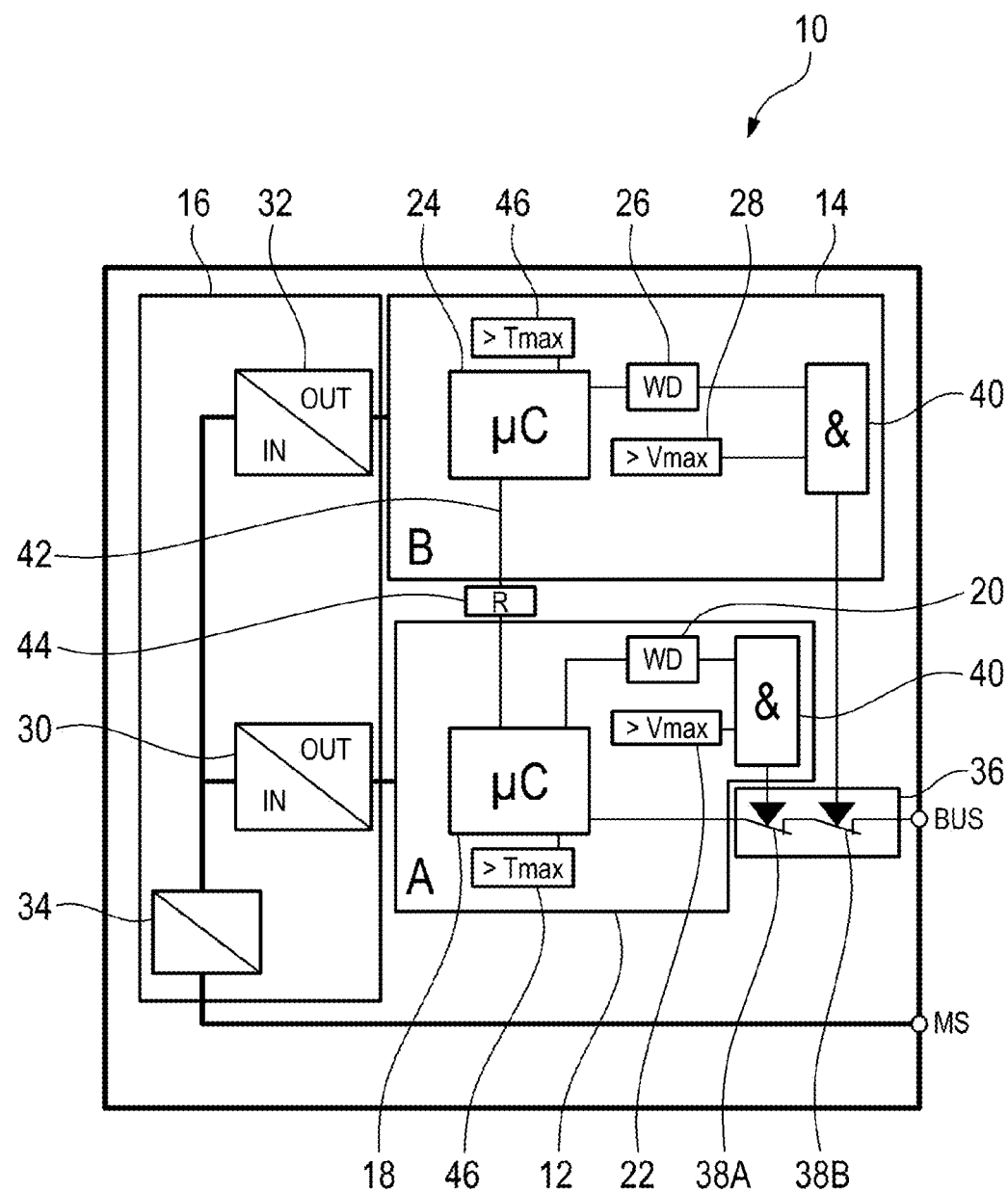
FIG. 1 shows a schematic diagram of an embodiment of a head module.

FIG. 1 shows a schematic diagram of a head module for a modular control device according to an embodiment of the present disclosure. The head module is denoted in its entirety with the reference numeral 10.

In this embodiment, the head module 10 includes a first channel unit 12 and a second channel unit 14 that form the redundant channel units. Further, the head module 10 may include a power supply unit 16.

The first channel unit 12 comprises a first processing unit 18 (µC A) and, here, a first failure detection unit 20 and a first monitoring unit 22 as first failure revelation units. The second channel unit 14 includes a second processing unit 24 (µC B), a second failure detection unit 26, and a second monitoring unit 28 (second failure revelation units). The units can be functionally identical but sourced from different manufacturers to increase the diversity of the system.

The power supply unit 16 may include a first power supply 30 that provides a supply voltage to the first channel unit 12, and a second power supply 32 that provides a supply voltage to the second channel unit 14. Further, the power supply unit 16 may include a third power supply 34 that converts a module voltage MS provided to the head module 10 into an intermediate voltage for the first power supply 30 and the second power supply 32. The module voltage can be provided to the head module 10 via a terminal MS from external sources. The external source can be a voltage supply module integrated in the modular control device. The module voltage can be provided uniformly to all modules of the modular control device to supply the module-internal electronics.

In one embodiment, the third power supply 34 may convert a module voltage MS of 24 V to an intermediate voltage of 5 V. The first power supply 30 and the second power supply 32 can separately convert this intermediate voltage for the respective channel units 12, 14 to various supply voltages for the processing units 18, 24 and generate, for example, a voltage of 3.3 V. In one embodiment, the power supplies 30, 32, 34 may be series regulators or switching regulators.

The voltage provided by the first power supply 30 and the second power supply 32 is supplied within the channel units 12, 14 to the respective monitoring units 22, 28. The monitoring units 22, 28 are designed independently of the respective processing unit 18, 24 and are configured to respond to an overvoltage or an undervoltage. According to the above example, the monitoring units 22, 28 may respond, for example, to an overvoltage of greater than 3.5 V and an undervoltage of less than 3.1 V.

Furthermore, the channel units 12, 14 each have a failure detection unit 20, 26 set up separately from the processing units 18, 24. The failure detection units 20, 26 may be designed as a watchdog and can act as a dead man's switch. For this purpose, the processing units 18, 24 continuously stimulate the failure detection units 20, 26, for example by the processing units 18, 24 sending a trigger to the failure detection units 20, 26 at defined intervals in order to reset a timer circuit located in the failure detection units 20, 26.

The failure detection units 20, 26 and the monitoring units 22, 28 per channel unit control jointly a bus disconnection unit 36 (bus shutdown unit), which is configured to shut down a communication bus. The communication bus establishes an active connection between the head module and the peripheral module parts and serves the exchange of data telegrams between the modules. The communication via the communication bus can be realized by a protocol, which is approved up to SIL4 and transports process images between the head and the peripheral module parts in secured and also forced dynamic data telegrams.

The bus disconnection unit 36 can shut down the communication bus, for example, by the unit physically disconnecting signal wires of the bus or pulling them to ground. The signal wires of the communication bus connect at least one processing unit (in FIG. 1 the first processing unit 18) to a BUS terminal of the head module. The bus disconnection unit 36 may be disposed therebetween and may include a switching element 38A, 38B per channel unit. In the present embodiment, the first failure detection unit 20 and the first monitoring unit 22 control the first switching element 38A via a logical "AND" link 40. The second failure detection unit 26 and the second monitoring unit 28 control the second switching element 38B via a further logical "AND" link 40. In the event of an overvoltage or undervoltage or an expired watchdog, communication via the communication bus is interrupted so that no more telegrams are sent to the peripheral module parts. In the case of intrinsically safe peripheral module parts that are set up as output modules, the missing telegrams lead to a timeout exception, which ultimately results in the outputs of the output module being switched off.

In the head module, the processing units 18, 24 of the channel units 12, 14 can additionally monitor each other via a dedicated interface 42 and, in the event of a fault, trigger an appropriate response via shutdown mechanisms within the processing units 18, 24. For example, interface 42 allows processing units 18, 24 to monitor each other's supply voltage and respond accordingly in the event of a fault. The interface 42 may include an overvoltage protection device 44.

In addition to the failure detection units 20, 26 and the monitoring units 22, 28, the channel units 12, 14 may each include temperature sensors 46 that monitor the respective temperature of the processing units 18, 24. If the temperature of these units rises above a critical threshold, a corresponding reaction is triggered and, for example, the process data is set to ZERO.

Due to the two-channel design with corresponding diversity of the components, the head module 10 can be approved up to SIL3 according to EN 61508. As will be explained below with reference to FIG. 4, it is also possible to use this head module for applications with a higher requirement profile than SIL3.

Figure 2:
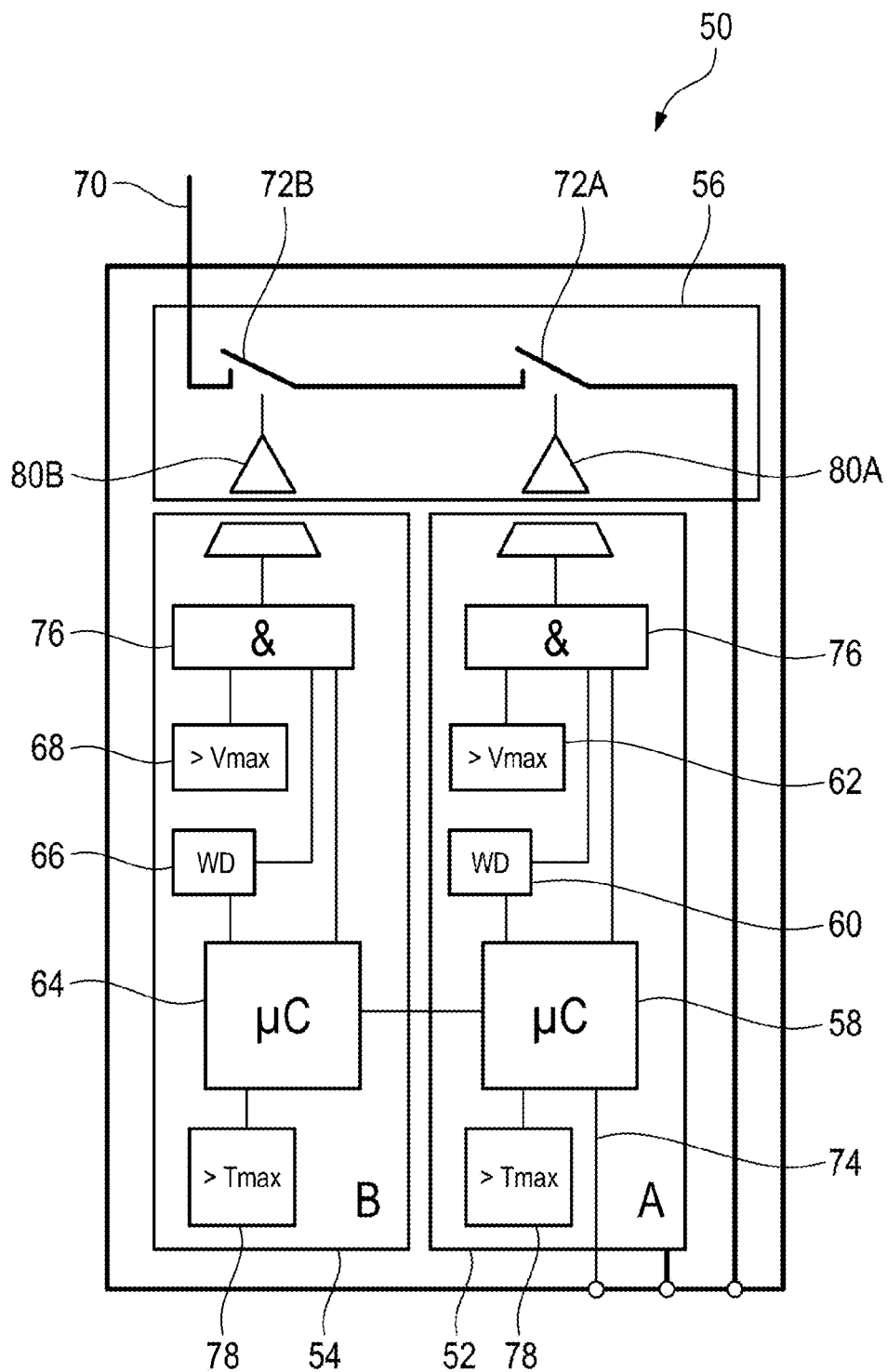
FIG. 2 shows a schematic diagram of an embodiment of a peripheral module part.

FIG. 2 shows a schematic diagram of a peripheral module part for a modular control device according to an embodiment of the present disclosure. The peripheral module part is denoted in its entirety by reference numeral 50. As will be explained in more detail below with reference to FIGS. 3 and 4, a peripheral module part can form a peripheral module together with a backplane module part. Similarly, multiple peripheral module parts with a backplane module part can form a peripheral module of the modular control device.

In this embodiment, the peripheral module part 50 includes a first channel unit 52 and a second channel unit 54 that form the redundant channel units. Further, the peripheral module part 50 includes an output unit 56.

The first channel unit 52 includes a first processing unit 58 (μC A) and, as first failure revelation units, a first failure detection unit 60 and a first monitoring unit 62. The second channel unit 54 includes a second processing unit 64 (μC B) and, as second failure revelation units, a second failure detection unit 66 and a second monitoring unit 68.

The channel units 52, 54, the processing units 58, 64, the failure detection units 60, 66, and the monitoring units 62, 68 may be analogous to the corresponding units of the head module 10. This also applies to the details of these units the will be mentioned below with respect to the head module 10.

The output unit 56 includes at least one output 70 that can be coupled to an actuator (not shown here), and switching elements 72A and 72B that can set the output 70 (i.e. switch it on or off). The first channel unit 52 controls the first switching element 72A and the second channel unit 54 controls the second switching element 72B. Output 70 is thus controlled redundantly. Furthermore, output 70 is connected via the switching elements 72A and 72B to a terminal PS, to which an external peripheral voltage is supplied. Turning output 70 on means closing switching elements 72A and 72B so that peripheral voltage is applied to output 70. An actuator connected to output 70, for example a contactor, is energized by the peripheral voltage when output 70 is set (switched on).

A module voltage from outside, which supplies the processing units 58, 64, is provided via a further terminal MS on the peripheral module part 50. The module voltage may be the same voltage available to the head module 10, and may be provided by a power supply module.

The processing units 58, 64 control the output unit 56 by control of the head module 10. For this purpose, at least one processing unit (here, the first processing unit 58) is coupled to the previously described communication bus via a bus connection 74 in order to receive the process image of the outputs (PIO) therefrom. The processing units 58, 64 process the process image of the outputs in a two-channel manner, wherein the processing units 58, 64 synchronize each other.

Furthermore, the control of the output unit 56 per channel unit is still dependent on the failure detection units 60, 66 and the monitoring units 62, 68, as indicated here by the logical "AND" operation 76. The monitoring units 62, 68 monitor the supply voltage of the processing units 58, 64, while the failure detection units 60, 66 each implement a watchdog for the processing units 58, 64. Only if all units agree, the switching elements 72A, 72B are actuated and the output 70 can be switched on. In addition, temperature monitoring of the processing units 58, 64 may be provided by means of a temperature sensor 78 in the manner described with respect to the head module 10.

The output unit 56 may be galvanically isolated from the channel units 52, 54 via separators 80A, 80B. The separators 80A, 80B may be circuits with optocouplers that allow the switching elements 72A, 72B to be actuated by the channel units 52, 54 without being galvanically connected to them for this purpose.

Due to the two-channel design with corresponding diversity of the components, the peripheral module part 50 can be approved up to SIL3 according to EN 61508. As will be explained below, it is nevertheless possible to use this peripheral module part in conjunction with the head module to enable applications with a higher requirement profile than SIL3.

Figure 3:
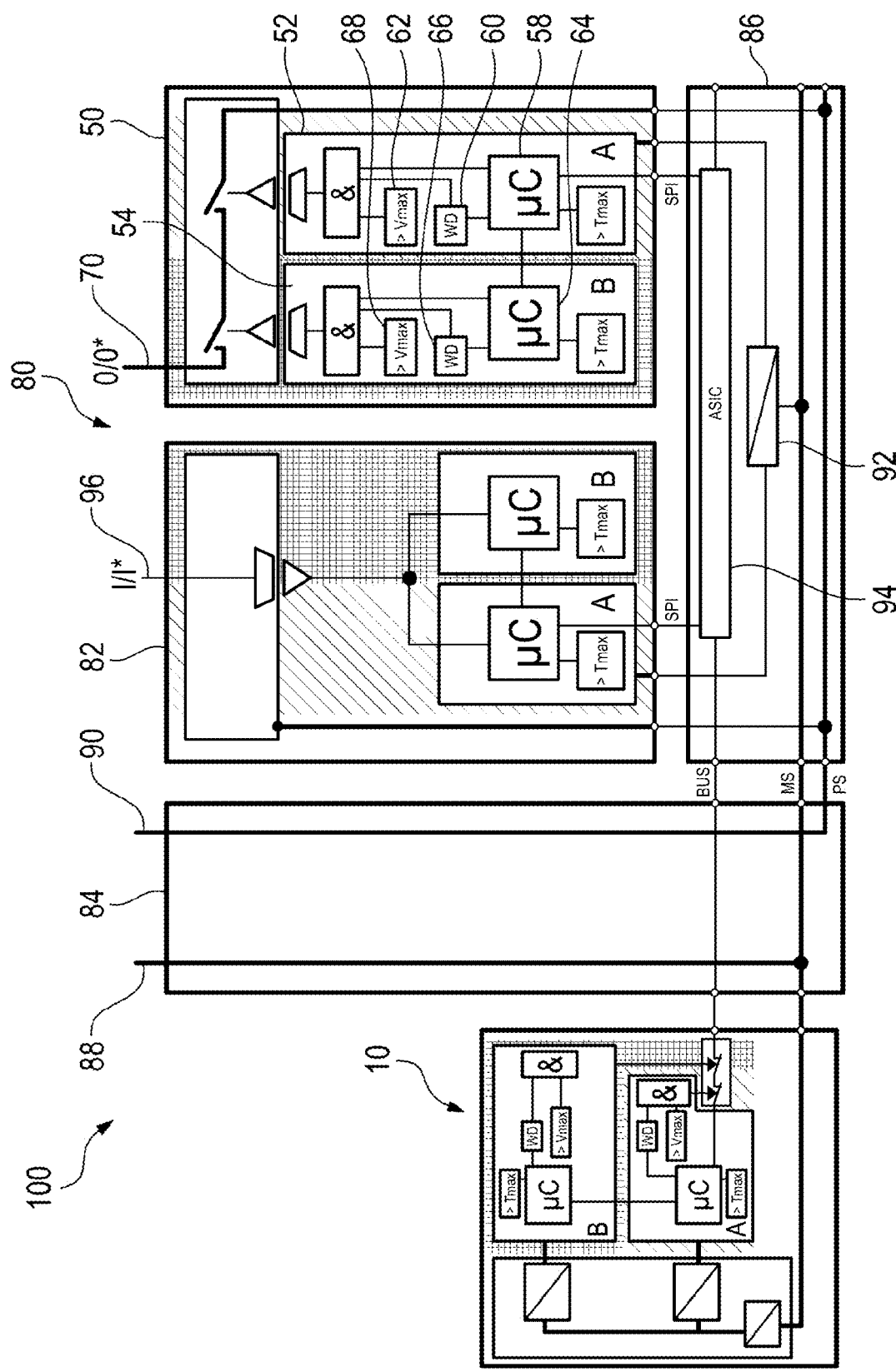
FIG. 3 shows a schematic diagram of an embodiment of a modular control device in a configuration for applications with a requirement profile up to SIL3.

However, FIG. 3 first shows a schematic diagram of an example of a modular control device in a configuration for applications up to SIL3. The modular control device is denoted here in its entirety with the reference numeral 100.

The modular control device 100 includes a head module 10 and a peripheral module assembly 80 that includes an input module part 82 and the previously described peripheral module part 50 as an output module part. Furthermore, the modular control device 100 includes a power supply module 84 and a backplane module part 86 that completes the peripheral module assembly 80.

The power supply module 84 provides terminals 88, 90 to supply the module voltage MS and the peripheral voltage PS described previously to the modular control device 100. The power supply module 84 may include means for monitoring the supplied voltage (not shown here), however, in principle the power supply module 84 does not need to be a fail-safe unit. The MS and PS voltages can be provided by power supplies (not shown here) connected to terminals 88, 90. These power supplies can be SELV/PLEV power supplies, for example, which reduces a safety consideration to a level of a voltage provided by the SELV/PLEV power supply.

The power supply module 84 has terminals to provide the module voltage MS to the head module. Furthermore, the power supply module 84 has terminals to supply the module voltage MS and the peripheral voltage PS also to the backplane module part 86. From the backplane module part 86, voltages are supplied to the input module part and the output module part of the peripheral module assembly 80. Further terminals of the power supply module 84 may pass the communication bus from the head module 10 to the backplane module part 86. It is also conceivable that the power supply module 84 itself may access the communication bus via a processing unit to communicate with the head module and/or the peripheral module parts. The processing unit may be electrically isolated from the terminals 88, 90 through which the module voltage MS and the peripheral voltage PS are received.

The backplane module part 86 carries the communication bus and the supply voltages to the peripheral module parts. The peripheral module parts are typically attached to the backplane module part 86. The backplane module part 86 may include a power supply 92 that converts the module voltage MS to a defined voltage for powering the electronic components of the attached peripheral module parts.

The backplane module part 86 may further include a control component 94. The control component can be an ASIC (Application-Specific Integrated Circuit), that allows the peripheral module parts to access the bus. The control component 94 receives and sends signals via the communication bus or forwards them. Data destined for a peripheral module part of the backplane module 86 is received by the control component 94 and passed to it via an interface (for example, an SPI (Serial Peripheral Interface)). The backplane module parts 86 have no safety function themselves. Faults in a backplane module part 86 are detected and controlled by means of the head module 10 or the intrinsically safe peripheral module parts (black channel principle). This requires the bus communication being implemented via a safe bus protocol. The bus protocol can be a protocol approved up to SIL 4.

The input module part 82 may have one or more inputs 96 to receive input signals from connected encoders. Like the output module part, the input module part 82 may have two channel units for two-channel processing of the inputs 96. For this purpose, each signal received at the inputs 96 is passed to and processed by both channel units to contribute to the process image of the inputs (PII) generated by the head module 10 for all inputs of the modular control device. The processing units of the different channel units basically monitor each other and compare the input signals. The determined states of the inputs are transmitted to the head module. For this purpose, the input module can access the communication bus in the backplane module part 86 via an interface, for example.

The head module 10 combines the information about the states of the inputs into a unified process image of the inputs and executes a user program that takes this process image as input. The user program can comprise a list of instructions that are processed one after the other in a cycle. The execution of the user program updates the process image of the outputs (PIO), which is transmitted to the output module part 50 at the end of the cycle. The output module part 50 receives the process image of the outputs (PIO) and, based thereon, controls the outputs 70 in the manner described with reference to FIG. 2. That is, the output module part 50 sets (turns on) the outputs 70 according to the process image of the outputs, provided that the processing units 58, 64 of the channel units 52, 54 do not detect a failure and the failure detection units 60, 66 and the monitoring units 62, 68 agree to turn on the outputs 70.

Since both the head module 10 and the peripheral module parts can be approved up to SIL3 and communication takes place according to the black channel principle, the architecture described can be approved for applications up to SIL3. For the control of CCF, no primary independence, as required for railroad applications, for example, is needed, since the additional measures described in connection with FIG. 1 and FIG. 2 in the head and output modules, together with the corresponding framework conditions (robust dimensioning of critical circuit parts, etc.), enable sufficient control of CCF.

The input module part 82 can handle two redundant inputs I/I* and the output module part 50 can handle two redundant outputs O/O*, and the modular control device as a whole can enable applications up to SIL3. The interrelated entities (units of observation) as defined by the relevant standards are highlighted here in each case by the hatching.

Furthermore, with the components described, an architecture can be achieved that enables applications with a higher requirement profile than SIL3 without fundamentally changing the design of the components. An example of such architecture is shown in FIG. 4.

Figure 4:
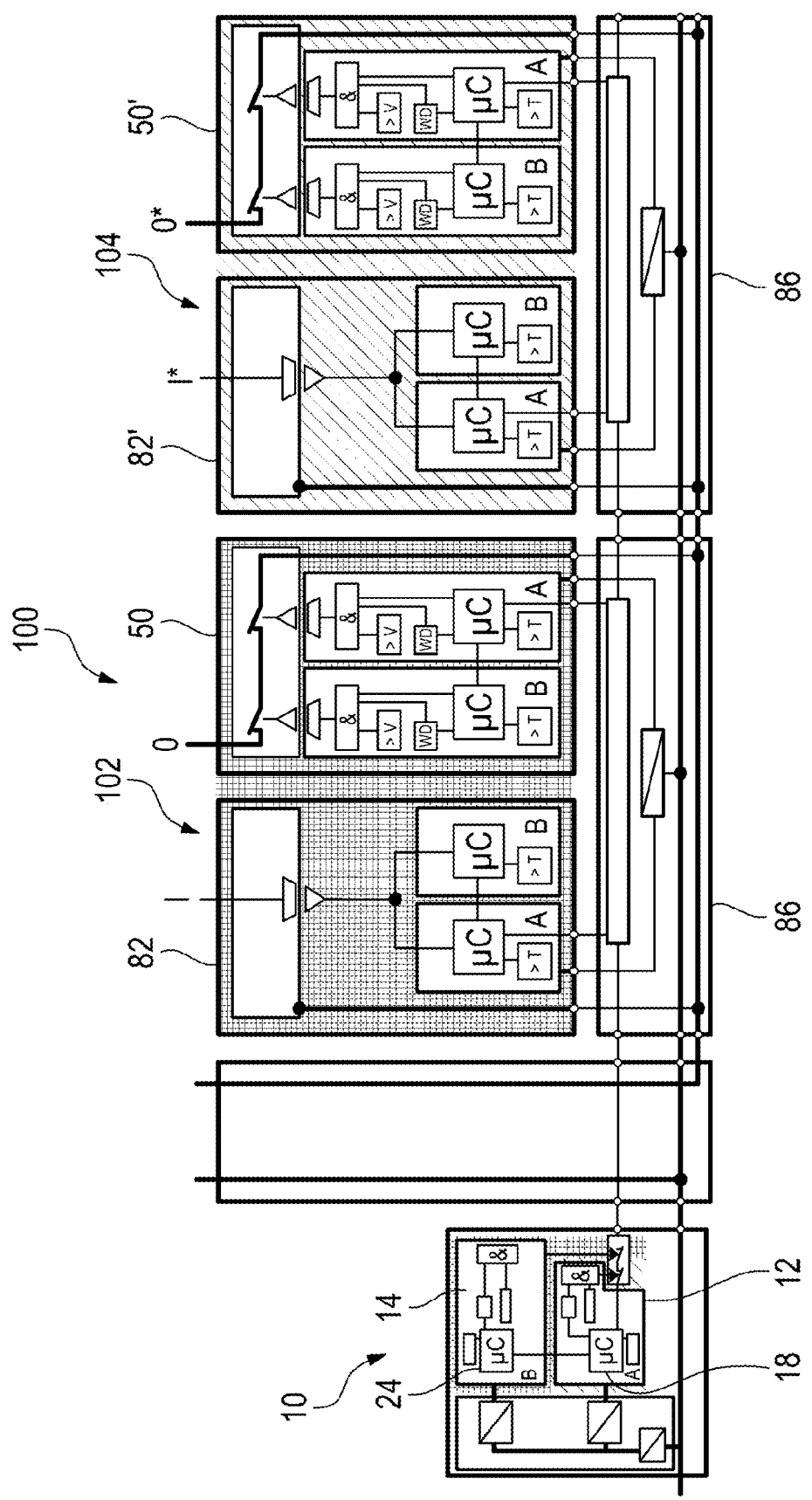
FIG. 4 shows a schematic diagram of an embodiment of a modular control device in a configuration for applications with a requirement profile higher than SIL3.

FIG. 4 shows a schematic diagram of an example of a modular control device in a configuration for applications with a higher requirement profile than SIL3. The same reference signs indicate the same parts as in FIG. 3, so that these parts are not described again in the following description.

In order to enable an architecture with the components described above, which do not have approval up to SIL4 according to the EN 61508 standard, that allows applications with a higher requirement profile than SIL3, a primary independence of the entities must be ensured, for example. Primary independence is required, for example, in railroad applications.

Primary independence can be achieved by splitting the redundant inputs I/I* and outputs O/O* between two assemblies 102, 104, each comprising an output module part 50, 50' and an input module part 82, 82', each coupled to a backplane module part 86. The input module part 82 and the output module part 50 of the first assembly 102, together with the first channel unit 12 in the head module 10, form a first normative entity, and the input module part 82' and the output module part 50' of the second assembly 104, together with the second channel unit 12 in the head module 10, form a second normative entity (each highlighted here with corresponding hatching). Each entity is thus formed by its own input module part, a channel of the head module and its own output module part. The redundant inputs I/I* and outputs O/O* are each divided between the entities and are thus located on different input or output modules. Thus, the input and output components are separated from each other and are only coupled via the communication device and power supply of the backplane.

In the head module 10, a separation of the channel units 12, 14 and their power supply must be provided in addition, since both entities are located within one module here. In principle, various approaches are conceivable to provide for such separation. The requirements for separation may depend on external circumstances, so that even simple separating devices may be sufficient if certain assumptions are made.

For example, the voltage monitoring prevents communication via the communication bus when voltages exceed a defined switch-off voltage (e.g. 3.5 V). Therefore, consideration of the interconnections between processing units 18, 24 is only necessary up to this shutdown voltage, since at voltages greater than the shutdown voltage, communication over the bus is prevented and errors in the processing units are therefore without effect on the peripheral module parts. In other words, a separator for a communication link between the processing units may be adjusted in view of the voltage monitoring. This communication regularly takes place via I/O interfaces. With regard to voltage monitoring, it is sufficient if MELF resistors are arranged in the connection between the terminals of the I/O interfaces. In the event of a stuck-at-high fault of a signal and an overvoltage equal to the shutdown voltage, the current on the connecting line is limited to a maximum value per connection. However, this current does not destroy the processing unit or its processor core. At most, the terminal pin of the I/O interface is destroyed. Since one terminal pin is always configured as input (Rx) and the other as output (Tx) on a communication line, only the output pin will ever be destroyed. However, this is not a CCF, since in each case the input pin of the other processing unit will not be affected by the defect.

The voltage monitoring as well as the failure detection unit itself should be set up for overvoltage related CCF. For this purpose, it may be sufficient if only the bus disconnection unit withstands a defined overvoltage, since the voltage monitoring unit and the failure detection unit control it dynamically and can be decoupled via series capacitors. Furthermore, the defined overvoltage can be limited to a certain voltage, e.g. by supplying the system from a SELV/PELV power supply (that is, a separated extra-low voltage power supply, safety extra-low voltage power supply, or protected extra-low voltage power supply) and thus limiting the defined overvoltage to a maximum value (e.g. 60 V).

It is understood that further connections to the processing units can be decoupled in this simple manner. Simple MELF resistors can be used here as well.

Figure 5:
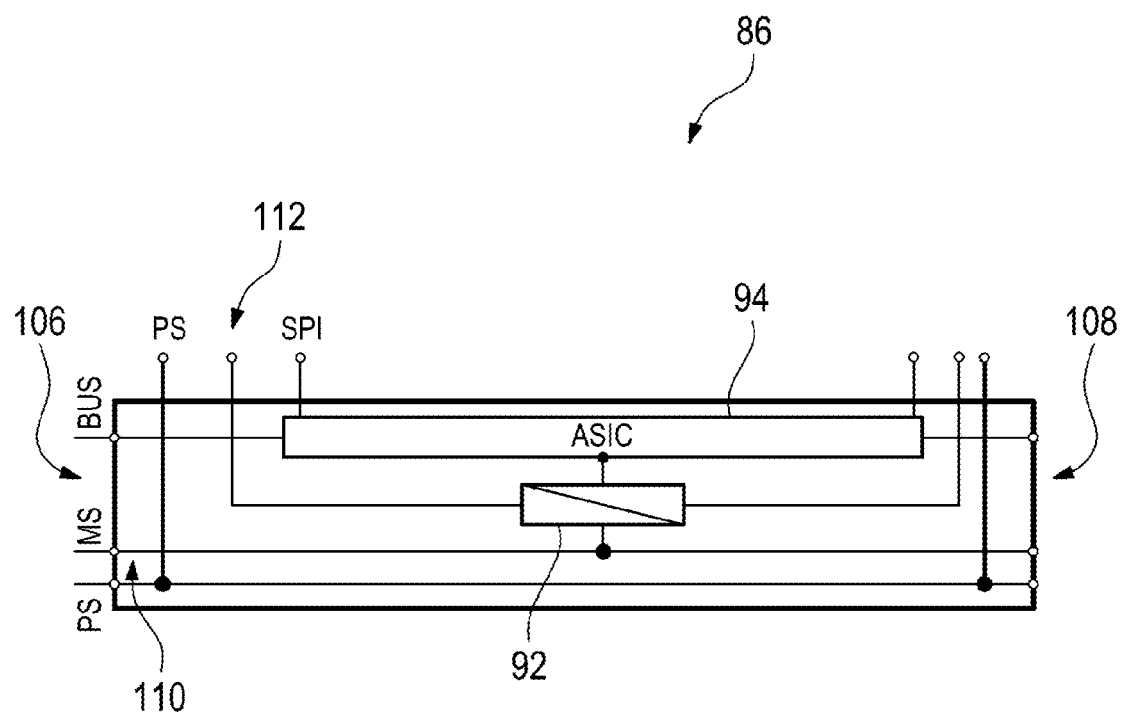
FIG. 5 shows a schematic diagram of an embodiment of a backplane module part.

FIG. 5 shows a schematic diagram of an embodiment of a backplane module part 86.

The backplane module part 86 provides the supply and communication links between the individual components of the modular control device. For this purpose, a plurality of backplane module parts can be interconnected in a row to provide a bus structure for both communication and power supply. Each backplane module part 86 has a set of first terminals 106 for connection to the left neighbour module and a set of corresponding second terminals 108 for connection to the right neighbour module. Connecting lines 110 connect the first terminals 106 to corresponding counterparts of the second terminals 108. In the embodiment example shown here, the first and second terminals 106, 108 include a MS terminal for the module voltage, a PS terminal for the peripheral voltage, and a BUS terminal for the communication bus.

Another set of terminals 112 connects the module parts associated with the backplane module part 86 to the bus structure. The terminals 112 may include direct or indirect connections to the respective connection lines 110. For example, as shown in FIG. 5, the peripheral voltage can be supplied directly to the connected module part, while the module voltage is first converted by a power supply 92 integrated in the backplane module part 86.

Furthermore, as previously described, the backplane module part 86 may provide a connection to the communication bus for the connected module parts. The connection can be realized via a control component 94 integrated in the backplane module part 86. The control component 94 of the backplane module parts 86 arranged in a row form nodes of the communication bus and may be implemented as ASICs, for example. The control component 94 can forward data to the next backplane module part, or take data and feed it to the connected module part if the data is intended for that module. The control component 94 can be connected to a processing unit of the connected module part via an SPI. Via the SPI, the processing unit can receive data from the communication bus and transfer data to the bus for sending.

By the foregoing embodiment of the backplane module parts 86, the backplane module parts 86 may contribute to the safety-related separation of the entities in the form of the peripheral module parts. Separation can be achieved via the control component, to which each peripheral module part can have a dedicated connection via an SPI. Furthermore, the use of separate backplane module parts 86 for each entity can ensure that each entity also has a separate power supply 92 for supplying power.

The backplane module part 86 is to be understood as exemplary only, and other embodiments are conceivable to interconnect the peripheral module parts and the head module.

Figure 6:
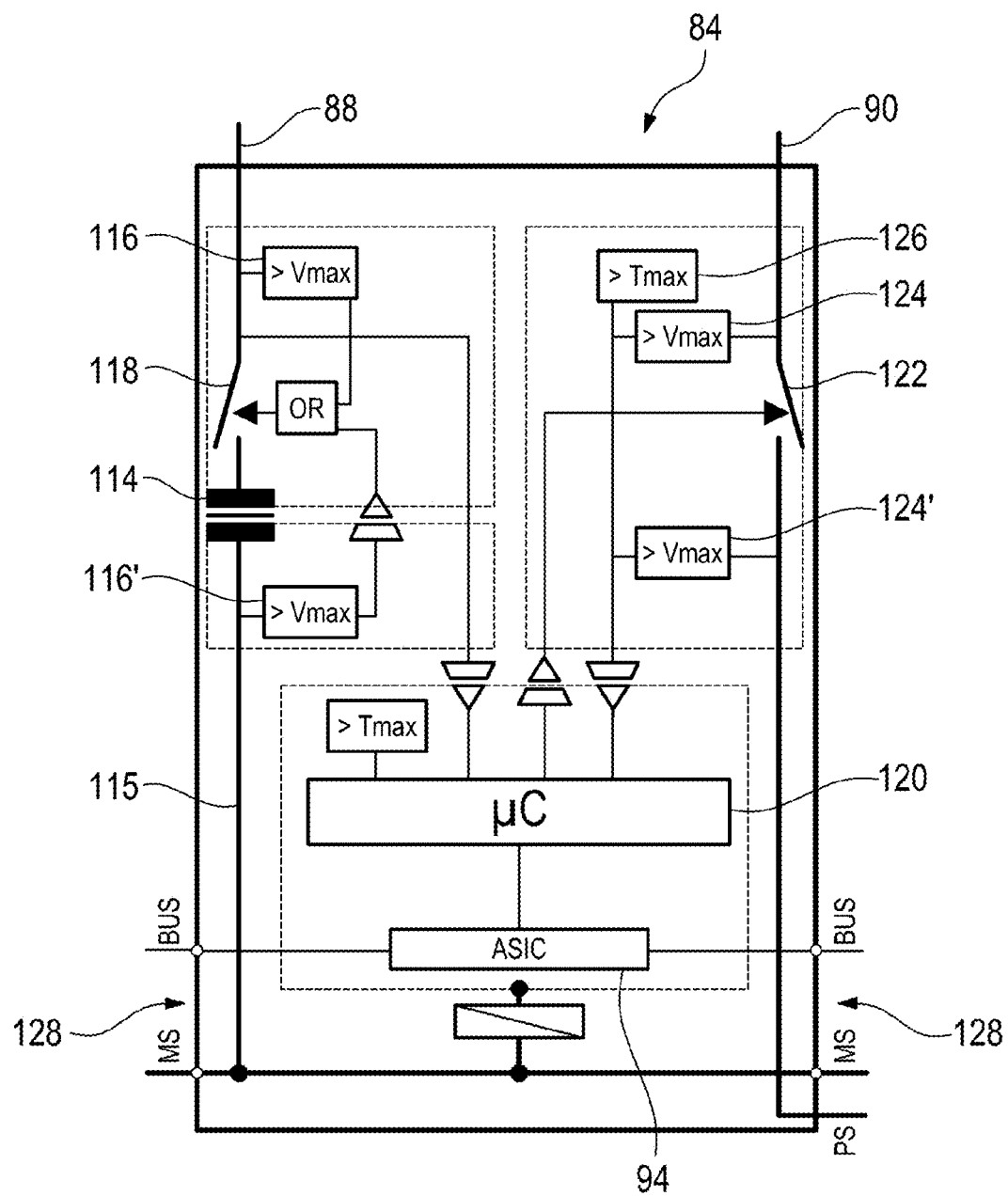
FIG. 6 shows a schematic diagram of an embodiment of a power supply module.

Finally, FIG. 6 shows a schematic diagram of an embodiment of a power supply module. The power supply module is denoted in its entirety by reference numeral 84.

The power supply module 84 includes terminals 88, 90 to receive an external supply voltage. The module voltage MS described above is supplied to terminal 88, and the peripheral voltage PS described above is supplied to terminal 90. In the present embodiment, the power supply module 84 further comprises measures for monitoring the supplied voltage.

The external supply voltage for MS can be provided by a SELV/PELV power supply unit. The nominal voltage can be the industry standard 24 V. A diode (such as a transil or transient-voltage-suppression diode) at terminals 88, 90 (not shown here) can limit voltage spikes to about 36 V. The supply voltage is supplied through a transformer 114 to the galvanically isolated supply voltage rail 115, the nominal voltage of which may also be 24 V. On the primary and secondary sides of the transformer 114 are voltage monitoring devices 116, set to 38 V, for example. If a voltage greater than 38 V is detected, the connection before the transformer 114 is disconnected by a switching element 118.

The external supply voltage for PS can also come from a SELV/PELV power supply. This voltage may be enabled by a processing unit 120 of the power supply module 84 via the switching element 122. For this purpose, the processing unit 120 can detect and evaluate a voltage upstream of the switching element 122 with a voltage monitoring device 124, the temperature at the PS rail with a temperature sensor 126, and the state of the PS rail downstream of the switching element 122 with a further voltage monitoring device 124', and respond accordingly.

Terminals 128, which may correspond to first terminals 106 of a backplane module part 86, pass the module voltage MS and the peripheral voltage PS to the connected modules. Furthermore, the power supply module 84 may be coupled to the communication bus. For this purpose, another control component 94 may be provided within the power supply module 84 to allow the processing unit 120 to access the communication bus in the manner previously described. The processing unit 120 and the control component 94 may be powered by another power supply 92 from the supply voltage rail 115.

The power supply module 84 is to be understood as exemplary only, and another power supply for the modular control device is also conceivable. In principle, the power supply module 84 need not be a fail-safe unit.

The invention claimed is:

1. A head module for a modular control device, the head module comprising:
   a plurality of redundant channel units, wherein each of the channel units includes a processing unit and a plurality of failure revelation units; and
   a bus disconnection unit configured to shut down a communication bus, wherein:
   the failure revelation units are configured to monitor a state of the channel units,
   the processing units are configured to continuously stimulate the failure revelation units,
   at least one of the processing units is coupled to signal wires of the communication bus to provide a communication link to one or more peripheral modules of the modular control device, and
   the failure revelation units are further configured to control, based on the stimulation and the monitoring, the bus disconnection unit to disconnect the signal wires of the communication bus in order to shut down the communication bus in a fail-safe manner.

2. The head module of claim 1 wherein:
   for each of the channel units, the failure revelation units include a monitoring unit and a failure detection unit,
   each of the monitoring units is configured to monitor a power supply provided to the channel units, and
   the failure detection units are each configured to provide a signal in response to the stimulation.

3. The head module of claim 1 wherein:
   the bus disconnection unit includes a plurality of switching elements, one corresponding to each of the channel units, arranged in the signal wires of the communication bus,
   each of the failure revelation units is associated with one of the switching elements, and
   the failure revelation units are configured to act jointly on the associated switching element.

4. The head module of claim 3 wherein each of the monitoring units is configured to generate a dynamic control signal based on the monitoring in order to act on the associated switching element.

5. The head module of claim 4 wherein the failure revelation units are configured to interrupt the generation of the dynamic control signal in response to the stimulation by the respective processing unit.

6. The head module of claim 1 further comprising, for each of the channel units, at least one capacitor arranged in series in a signal path of a respective one of the failure revelation units between a respective one of the processing units and the bus disconnection unit.

7. The head module of claim 1 wherein the channel units are configured to communicate with the one or more peripheral modules of the modular control device exclusively via the communication bus.

8. The head module of claim 1 wherein the processing units are configured to communicate with each other via an interface independent of the communication bus in order to monitor each other.

9. The head module of claim 8 wherein an overvoltage protection for the interface is set based on a respective monitored supply voltage.

10. The head module of claim 1 wherein each of the processing units is configured to perform a functional test of an associated one of the failure revelation units and to read back a test result.

11. A peripheral module for a modular control device, the peripheral module comprising:
    a plurality of redundant channel units;
    an output unit, wherein:
        the output unit is configured to set one or more outputs in response to control by the channel units,
        each channel unit of the channel units includes (i) a processing unit and (ii) a plurality of failure revelation units configured to monitor a state of the channel unit,
        the processing units are arranged to respectively stimulate ones of the failure revelation units, and
        the failure revelation units of each channel unit are collectively arranged to control setting of the outputs of the output unit in response to the stimulation and monitoring; and
    a bus disconnection unit configured to disconnect signal wires of a communication bus between the peripheral module and a head module of the modular control device in order to shut down the communication bus in a fail-safe manner.

12. The peripheral module of claim 11 wherein the failure revelation units of each channel unit are configured to generate a dynamic control signal in response to the monitoring to control the output unit.

13. The peripheral module of claim 12 wherein the failure revelation units of each channel unit are configured to interrupt the generation of the dynamic control signal in response to the stimulation by the respective processing unit.

14. The peripheral module of claim 11 wherein the output unit is galvanically isolated from the channel units.

15. A modular control device comprising:
    the head module of claim 1; and
    a peripheral module including:
        a plurality of redundant peripheral channel units; and
        an output unit, wherein:
            the output unit is configured to set one or more outputs in response to control by the peripheral channel units,
            each peripheral channel unit of the peripheral channel units includes (i) a peripheral processing unit and (ii) a plurality of peripheral failure revelation units configured to monitor a state of the peripheral channel unit, the peripheral processing units are arranged to respectively stimulate ones of the peripheral failure revelation units, and the peripheral failure revelation units of each of the peripheral channel units are collectively arranged to control setting of the outputs of the output unit in response to the stimulation and monitoring.

16. The modular control device of claim 15 further comprising:

a second peripheral module, wherein:

a first channel unit of the channel units forms a first functional unit with the peripheral module, and a second channel unit of the channel units forms a second functional unit with the second peripheral module independent of the first functional unit.

17. The modular control device of claim 16 wherein the head module, the peripheral module, and the second peripheral module communicate with each other exclusively via the communication bus.

18. The modular control device of claim 15 further comprising a power supply module configured to:

supply a common module voltage as a power supply for the head module and the peripheral module, and supply a peripheral voltage to the output unit of the peripheral module.

19. The modular control device of claim 18 wherein:

the power supply module receives power from a power supply in order to supply at least one of the common module voltage and the peripheral voltage, and the power supply is at least one of separated extra-low voltage and protected extra-low voltage.

20. A method of operating a head module including a plurality of redundant channel units that each includes a processing unit and a plurality of failure revelation units, the method comprising:

for each of the channel units, monitoring, using the corresponding failure revelation units, a state of the channel unit;

for each of the channel units, continuously stimulating, using the corresponding processing unit, at least one of the corresponding failure revelation units; and based on the stimulation and the monitoring, controlling a bus disconnection unit to shut down a communication bus that provides a communication link between the head module and one or more peripheral modules, wherein shutting down the communication bus includes disconnecting signal wires of the communication bus in order to shut down the communication bus in a fail-safe manner.

* * * * *